United States Patent [19]

Salisbury

[11] 4,395,631

[45] Jul. 26, 1983

[54] HIGH DENSITY ION SOURCE

[75] Inventor: Winfield W. Salisbury, Scottsdale, Ariz.

[73] Assignee: Occidental Research Corporation, Irvine, Calif.

[21] Appl. No.: 85,261

[22] Filed: Oct. 16, 1979

[51] Int. Cl.[3] .......... H01S 9/00

[52] U.S. Cl. .......... 250/251; 376/130

[58] Field of Search .......... 176/1, 2, 3, 5; 250/423 R-427, 251; 313/359-363; 376/130

[56] References Cited

U.S. PATENT DOCUMENTS

| | | | |
|---|---|---|---|
| 3,155,592 | 11/1964 | Hansen et al. | 176/2 |
| 3,155,593 | 11/1964 | Warnecke et al. | 176/2 |
| 3,258,402 | 6/1966 | Farnsworth | 176/2 |
| 3,445,333 | 5/1969 | Lecomte | 176/1 |
| 3,530,036 | 9/1970 | Hirsch | 176/5 |
| 3,530,497 | 9/1970 | Hirsch | 176/2 |
| 3,533,910 | 10/1970 | Hirsch | 176/2 |
| 3,609,369 | 9/1971 | Croitoru | 176/1 |
| 3,846,636 | 11/1974 | Zehr et al. | 250/251 |
| 3,859,164 | 1/1975 | Nowak | 176/2 |
| 4,028,579 | 6/1977 | King | 316/362 |
| 4,189,346 | 2/1980 | Jaragin | 176/5 |
| 4,202,725 | 5/1980 | Jarnagin | 176/5 |

*Primary Examiner*—Sal Cangialosi

[57] ABSTRACT

A source for a high density electrically neutral beam of combined positive and negative particles suitable for bombardment and heating of a pellet of nuclear fusion material to fusion temperature. A source mounted in a housing with a spherical substrate having positive ion emitter material thereon, first, second and third grids spaced from each other along the beam path, and electron emitters, for providing positive ion beams and electron beams at the same velocity for mixing to provide an overall electrically neutral beam. A source utilizing a zeolite type compound, such as B-eucryptite or sodium mordenite, which on heating emits positive ions of an element in the compound, such as lithium or sodium. A source housing including precision ceramic rings with metal flanges, with substrate and grid structures carried on the flanges, with the flanges joined as by heliarc welding at their peripheries to provide a rigid mechanical and vacuum tight structure, with metal spacer rings between ceramic rings when desired.

24 Claims, 5 Drawing Figures

HIGH DENSITY ION SOURCE

BACKGROUND OF THE INVENTION

This invention relates to sources for positive ion particle beams. Such beams are suitable for use for bombardment, compression and heating of a pellet of nuclear fusion fuel to fusion temperature, for injection of particles into magnetic fusion machines such as tokomacs, and other known purposes. A fusion apparatus utilizing positive ion particle beams and sources for such beams are disclosed in copending U.S. application Ser. No. 024,314, filed Mar. 27, 1979 and assigned to the same assignee as the present application. Reference may be made to said application for further information on the utility of positive ion particle beams.

Positive ion sources in general include some form of emitter, extractor grid and accelerator grid to produce the positive particle beam, plus a supply of electrons or other negative particles to make the total charge on the beam substantially electrically neutral. Various problems have been encountered in the sources in the past. A high density often is required at the target and a typical density for some applications is in the range of thousands of amperes per square centimeter. Emitting particle beams of such densities is not practical in a controllable manner. However sources have been proposed with relatively large emitter areas with the particle beams being focused to a smaller target area, and with the beams being pulsed with the pulses compressed in time thereby achieving higher density at the target. When light materials such as deuterium are used as the positive ion source, a relatively high energy pulse is required. A heavy material such as cesium or xenon has been proposed but these heavy ions lose electrons during transit and are difficult to focus as well as to accelerate. However it has been discovered that medium weight particles, such as lithium and sodium, can be utilized without encountering the problems associated with heavier particles while at the same time operating with energy inputs substantially less than that required for deuterium, typically with one-tenth of the energy requirement. Accordingly, it is one of the objects of the present invention to provide a new and improved source utilizing ions of medium weight, preferably alkali metals, for the positive particles in the particle beam.

Another problem encountered with particle beam sources has been that associated with high density currents which are self-limiting in many source configurations. It has been discovered that there is an optimum configuration for grids with respect to the emitter and it is another object of the present invention to provide a new and improved source design utilizing such optimum physical configuration.

Typically a pulse power supply is utilized to drive the source and electrical connections are required between the power supply and the various components of the source. The physical arrangement of these electrical connections often is a problem with high density, high voltage systems and it is an object of the present invention to provide a new and improved electrical circuit utilizing a plurality of series capacitors for achieving electrical interconnections. A further object is to provide a new and improved housing design for positioning and maintaining the physical relationship between the various components despite the high temperatures at which source typically are operated.

Other objects, advantages, features and results will more fully appear in the course of the following description.

SUMMARY OF THE INVENTION

One embodiment of the invention includes a substrate with a generally spherical surface with positive ion emitter material at the surface, a positive ion extractor grid, a positive ion accelerator grid, an electron accelerator grid, and electron emitters, all mounted in a housing with the grids in alignment between the substrate and electron emitters. The housing preferably is formed of electrical insulator rings with metal flanges with the various components carried on the flanges and with adjacent flanges welded together to provide a rigid mechanical structure. Precision metal spacer rings may be utilized between the insulator rings where desired.

The invention also includes electrical circuitry for coupling a pulse supply to the emittters and grids, in the form of a series of capacitors connected across the supply and to the emitters and grids. The extractor grid is formed of a plurality of spaced conductors with the distance between adjacent conductors not more than substantially twice the distance between the conductors and the positive ion emitter material thereby eliminating deceleration of portions of high density current beams passing the extractor grid.

The positive ion emitter material is one which provides a medium weight positive ion, typically an alkali metal ion, and preferably is a zeolite type compound such as B-eucryptite or sodium mordenite.

DESCRIPTION OF THE PREFERRED EMBODIMENTS

Figure 1:
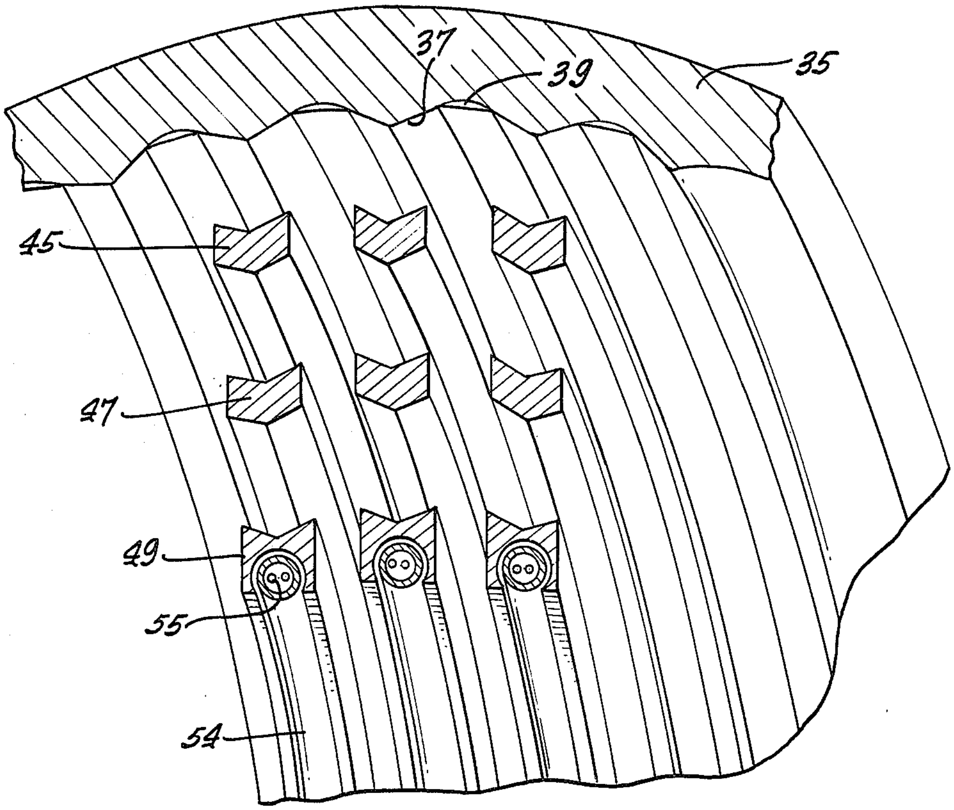
FIG. 1 is a perspective view of a portion of a particle beam source incorporating the presently preferred embodiment of the invention.

The source of FIGS. 1–5 provides positively charged ions suitable for the bombardment and compression and heating of a pellet of nuclear fusion fuel to fusion temperature.

Ions for this purpose must meet several requirements. The ion source must produce ions of low random energy, which ions are generally known as low temperature ions. Random energy of the ions will enlarge the minimum size focal spot that can be obtained at the ion focus point and thus reduce the efficiency with which the focused ions transfer their momentum and kinetic energy to the target. Efficiency of this momentum and energy transfer is required for efficient operation of a fusion energy source.

The ion source must emit and accelerate ions from a definite surface, preferably of spherical shape, so that the ions after acceleration within the ion source are ballistically focused on the target. Ballistic focus is desirable so that the focus is unaffected by the amount of acceleration or final velocity of the ions, in order to allow variable ion velocity during an ion pulse of appreciable duration. Varying the ion velocity during the pulse is desired to produce phase or time focus of the ions in order to reduce the duration internal to the ion source. Thus both geometric (or ballistic) compression and pulse duration compression of the ion pulse can be used to produce extremely high densities of ions at the target, compared to those required at the ion source. Thus an extended ion source of considerable area and reasonable ion current density can produce in a short interval a very large pressure and energy flux at the target, such as that necessary to compress and raise fusion fuel to the temperature pressure and particle density necessary for efficient nuclear "burning" of the fusion fuel.

The foregoing operational requirements place several constraints on the ion source which it is the purpose of this invention to meet.

Even though the geometric and pulse duration compression can be many orders of magnitude, it is desirable to start with a respectable ion current density at the source in order to allow the design of apparatus of reasonable size, mechanical stability and efficiency.

Several features of this ion source invention provide for these necessary performance requirements. One is the use of a material as an ion source which emits the desired ions from a heated matrix in a way similar to the emission of electrons from the types of thermionic emitters frequently used in electron vacuum tubes.

The positive ion emitter material is a zeolite type compound which includes a loosely bound medium weight element, which compound on heating gives off a positive ion of the element. As used herein, medium weight elements are those in the range of lithium to rubidium.

The emitter material is selected to provide positive ions of low temperature and low random energy and must remain solid at the emitting temperature, which typically is in the range of about 1000° to 2000° K., providing ions with energies of about 0.1 to 0.2 electron volts.

One such positive ion emitter material suitable for emitting lithium ions is B-eucryptite, and lithium is a suitable substance for ionization for fusion compression and heating purposes. B-eucryptite is a glass-like material which can maintain its mechanical integrity on a metallic electrode and support up to 1,500 or more degrees centigrade. In this temperature range, it is capable of emitting lithium ion densities of one ampere or more per square centimeter. This is a desirable range of emission current density and is capable of producing the necessary primary ion current over a large area so that the momentum and power transfer to the target is in the range required for producing an efficient fusion energy release. The emission of lithium ions is produced both by heat and the application of a suitable electric accelerating field for the ions.

B-eucryptite is a zeolite in the form of a glasslike matrix including lithium. Other zeolites which provide a medium weight metal ion on heating are also suitable, and examples of such materials include sodium mordenite and potassium mordenite. Alkali metals in the medium weight range are preferred for the positive ions.

The production of a suitable electric field during an ion source pulse places dertain constraints on the ion extractor and accelerator grids.

Consider first the extractor grid electrodes. A more exact understanding of the requirements for the operation of an extractor electrode can be approached by considering a beam of positive ions passing through an acceleration space and into the region between two electrodes of an extractor grid. In the acceleration space the Child-Langmuir law clearly must be satisfied. An understanding of the conditions necessary for the positive ions to pass between the grid electrodes is simplified by realizing that the ion beam carries electric current which depends locally on the local electric fields as well as the energy and momentum carried by the mass of the individual charged particles. That is, the beam of ions considered as an electric conductor must, for the potential difference between the ion source emitter and the grid electrodes, have the capacitance to hold a charge on the electrodes at least equal to the charge carried by the beam in the space between the electrodes. If this criterion is not met, only a skin of the beam next to each electrode which meets this requirement can pass through the grid. The rest of the internal part of the beam between any two grid electrodes will be decelerated and returned to the source by the self field of the beam ions. If the above condition is not exceeded, the beam coming through the grid will vary in energy across the portion of the beam between each pair of adjacent electrodes in an unacceptable way.

These required conditions can be combined as a theoretical extension of the Child-Langmuir law, which shows that the extractor grid must not have a spacing between adjacent electrodes greater than twice the distance from the ion source to the nominal grid surface.

A high current density is required from the source itself and a low random energy is required from the ion produced by the source, and it is also desirable to have an ion source that produces a minimum flow of unionized material during ion emission. There are several essential components to an ion source. There must be a medium containing the material to be ionized. Then a source of ionization energy is required, and last of all a means of extracting the ions and accelerating them to their desired velocity and energy. These fundamentals can be combined in a variety of ways. One fundamental feature is common, however, to all ion sources, and that is the geometrical configuration of the electrodes of the extractor grid. The extractor grid must be sufficiently porous to allow the accelerated ions which it draws from the ion plasma, to pass through it. At the same time, it must provide the accelerating field without being swamped by the field of the charges as they pass through.

Understanding this part of the problem requires a complex extension of the Child-Langmuir law to 3 dimension. Electric fields can be produced in several ways and this fact sometimes confuses the issue. There are 3 fundamental sources of electric fields. The primary one is the electric field due to electric charges in corpuscular form, as the electric field of an electron or proton for example. The other sources of electric fields are more transient. An electric field can exist in the volume occupied by a changing magnetic field. This is really another aspect of the electric fields which exist in accompaniment of a moving electromagnetic wave. Among these 3 sources of electric fields, the one which is used to accelerate ions at a primary ion source is the field of electric charges. Thus, to accelerate positively charged ions, an electrode is required which has a negative charge, in order to make the electric field between the ion emitter and the extractor grid in the direction to extract positively charged ions toward the extractor grid.

Both the charges in the plasma at the emitter and the charges in the extractor grid are corpuscular and for accelerating ions from the plasma, the grid must have electrons to produce its charge and the electric field necessary to extract and accelerate the positive charged particles. For small ion currents, enough electrons can be put in the extractor grid so that they overwhelm the charge of the accelerating positive ions. However this ceases to be the case as we approach the limit of the amount of current density that can be accelerated from a plasma by a given grid. Thus, the amount of current density which can be produced by a given configuration is limited by the amount of current density which will provide a number of charges passing through the grid at least equal to the number required to charge it to the potential necessary for the acceleration. This is an absolute limit and a working ion source must operate somewhere below this limit. Attempts to operate with more charges passing through than exists in the grid will lead to reverse fields and therefore limit the amount of positive charged ions that can be extracted.

The ion source in this invention is intended for use in a pulse mode. Pulses shaped with a rising voltage during the pulse will produce a phase focusing of particles so that particles leaving the ion source at times later in the pulse will have a higher velocity than those in the initial start of the pulse. This causes the last particles to catch up with the first, so that the pulse of ions arriving at the target is compressed in duration compared to the pulse applied to the ion source. Duration compression ratios of 100 to 1000 can thus be produced.

The frequency spectrum of the voltage at the ion source is confined to high frequency fourier components, the lowest frequency of which corresponds to the reciprocal of the pulse duration. This frequency is such that a capacitive voltage divider can be built into the ion source connections, and hence the only D.C. electrical connections required for the extractor grid and accelerator grid are those necessary to provide leakage paths to discharge accidental electric charge collection due to ion and electron spray. The charge must be leaked off during the interval between recurring main pulses. This leakage requirement allows high resistance and relatively high inductance paths compatible with reasonable wiring practices.

The capacitance between grids must be of values to satisfy the voltage ratio requirements of the various grids and must have an overall series capacitance value such that the impedance of this overall capacitance at the lowest frequency fourier component is low (say 10% or less) compared to the impedance (voltage to current ratio) of the particle beam pulse.

Another characteristic of the ion source is final discharge of the ions into an electric-field-free space, which may be accomplished by maintaining the final accelerator grid at ground potential at all times.

In the embodiment disclosed, the positive ions are ballistically focused on the target as they emerge from the final accelerator grid. Thereafter it is desirable to inject electrons into the ion beam, with the electrons of substantially the same velocity as the positive ions, to produce a neutral but ballistically focused beam. This can be done by having an electron source in the shadow of the final accelerator grid electrodes. The electron source should be surrounded by a shield and accelerator grid for electrons, and the positive ions will undergo a small final deceleration equal to the small electron acceleration needed to inject the space charge neutralizing electrons at approximately positive ion beam velocity. For example, if positive ions of 500 kv energy are produced for the main beam, a small deceleration of about 8 kv can be used at an electron accelerator grid to bring the electrons and the positive ions to the same velocity for mixing. The 8 kv taken from the 500 kv ions can be compensated for by a corresponding increase in the 500 kv source and in any case is a small correction if uniformly applied.

Figure 2:
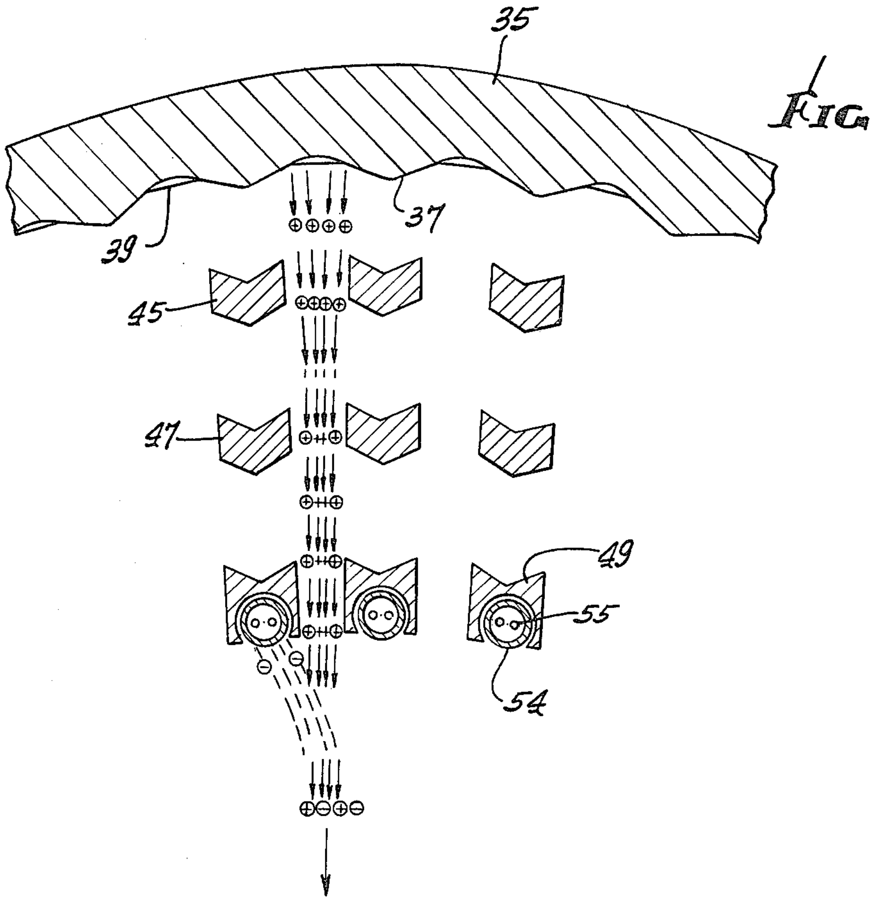
FIG. 2 is a sectional view of the source of FIG. 1.
Figure 3:
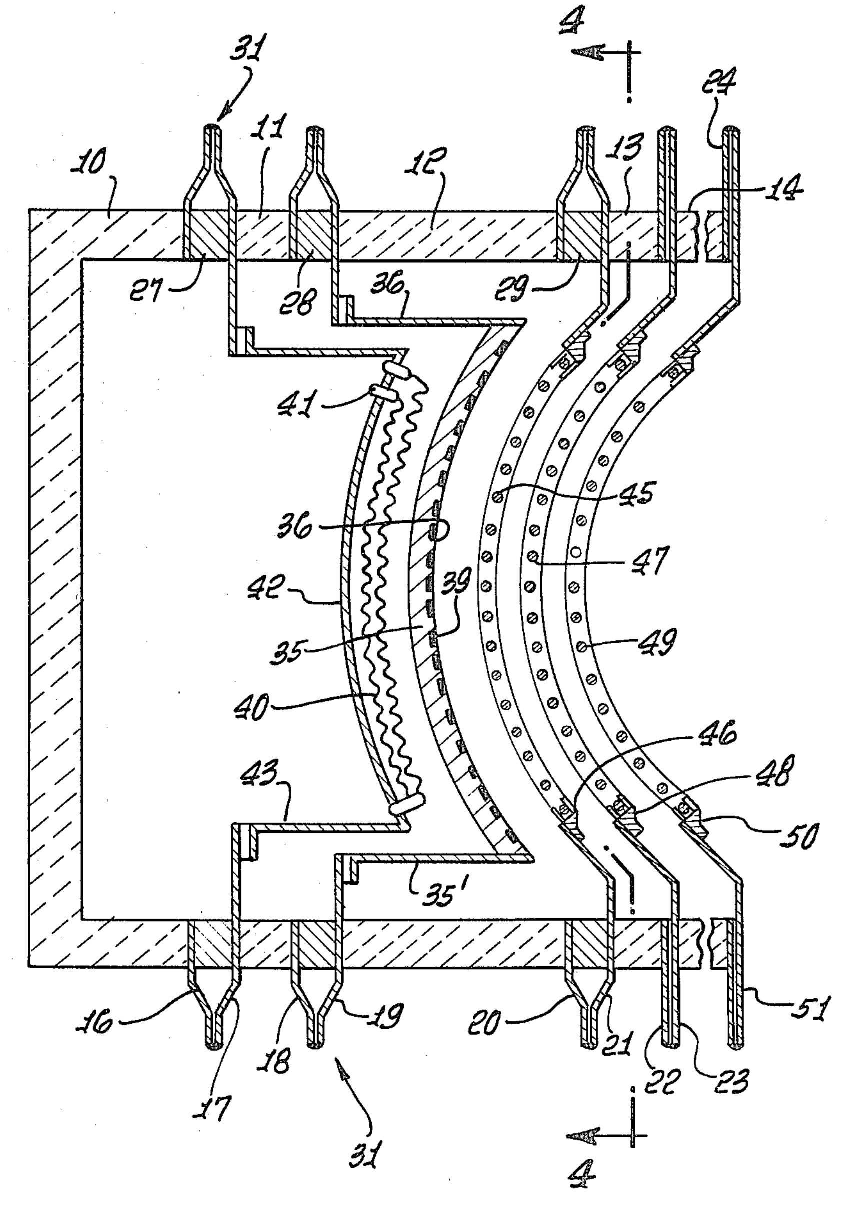
FIG. 3 is a longitudinal sectional view of the source of FIG. 1.
Figure 4:
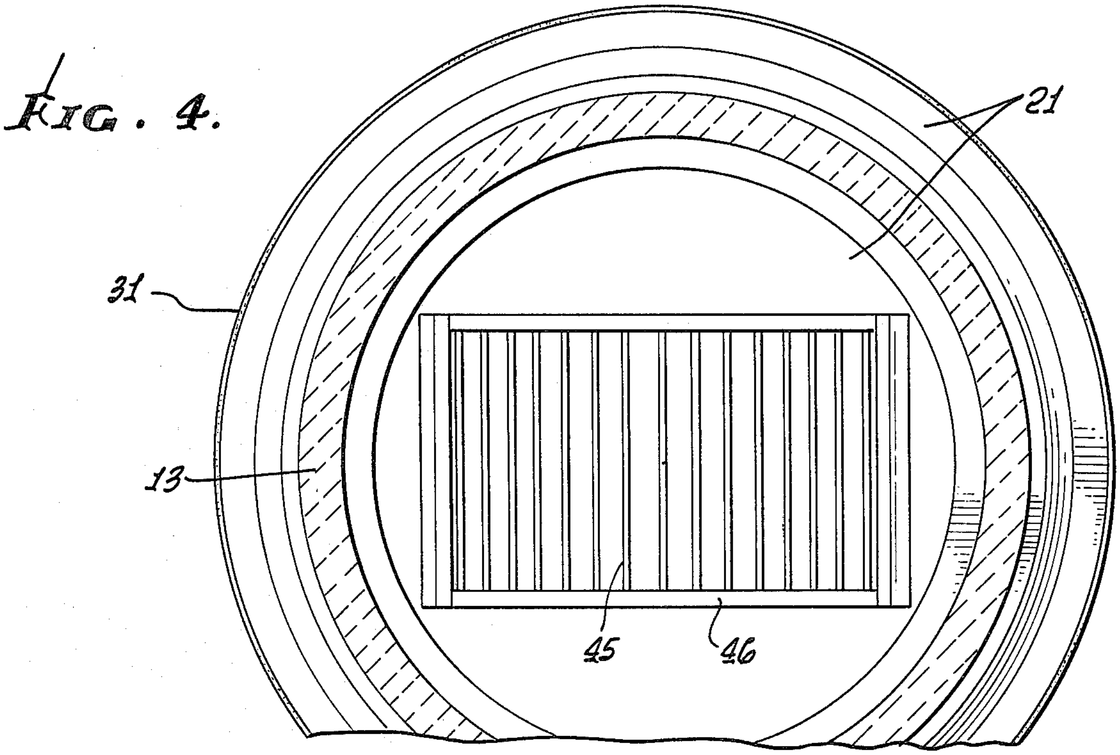
FIG. 4 is a sectional view taken along 4—4 of FIG. 3.

The preferred embodiment as illustrated in FIGS. 1–4 includes a housing having a ceramic end cap 10 and ceramic support rings 11, 12, 13, 14. The annular end of the cap 10 is metallized and a metal flange 16 is attached thereto by braising or welding or the like. Both ends of the ring 11 are metallized and flanges 17, 18 are similarly attached. Flanges 19, 20 are similarly attached to the ring 12, flanges 21, 22 to the ring 13, and flanges 23, 24 to the ring 14. Metal spacer rings may be positioned between ceramic rings as desired to obtain the desired spacing between components, and three such rings, 27, 28, 29, are shown in FIG. 3.

Various components of the source are mounted on various of the metal flanges, as will described hereinbelow. The rings are assembled in stacked relationship as shown in FIG. 3, with various pins, jigs and/or fixtures utilized to obtain the exact desired alignment between the various elements of the source. Then the adjacent metal flanges are welded together at their periphery as indicated at 31 to provide a rigid and vacuum tight structure.

A substrate 35 is carried on brackets 35' attached to the flange 19. The substrate is formed of a high temperature resistant material, typically sintered tungsten, and is provided with a spherical surface 36, preferably having parallel grooves 37 in said spherical surface. The ion emitter material is carried on the surface 36 of the substrate 35, preferably being deposited in strips in the bottoms of the grooves 37, with the outer edges of the grooves serving as field shaping elements.

A resistance heater element 40 is supported on electrical insulators 41 from a spherical heat reflector 42 which in turn is carried on brackets 43 attached to the flange 17.

The first extractor grid is formed of electrodes 45 mounted in a frame 46 carried on the flange 21. The second accelerator grid is formed of electrodes 47 carried in a frame 48 on the flange 23. The third electron accelerator grid is formed of electrodes 49 carried in a frame 50 with the flange 51. An electron source if provided at the electron accelerator grid, and preferably comprises an emitter in the form of a tube 54 positioned within and electrically insulated from each of the electrodes 49, with a resistance heater element 55 within the tube, as best seen in FIGS. 1 and 2.

Figure 5:
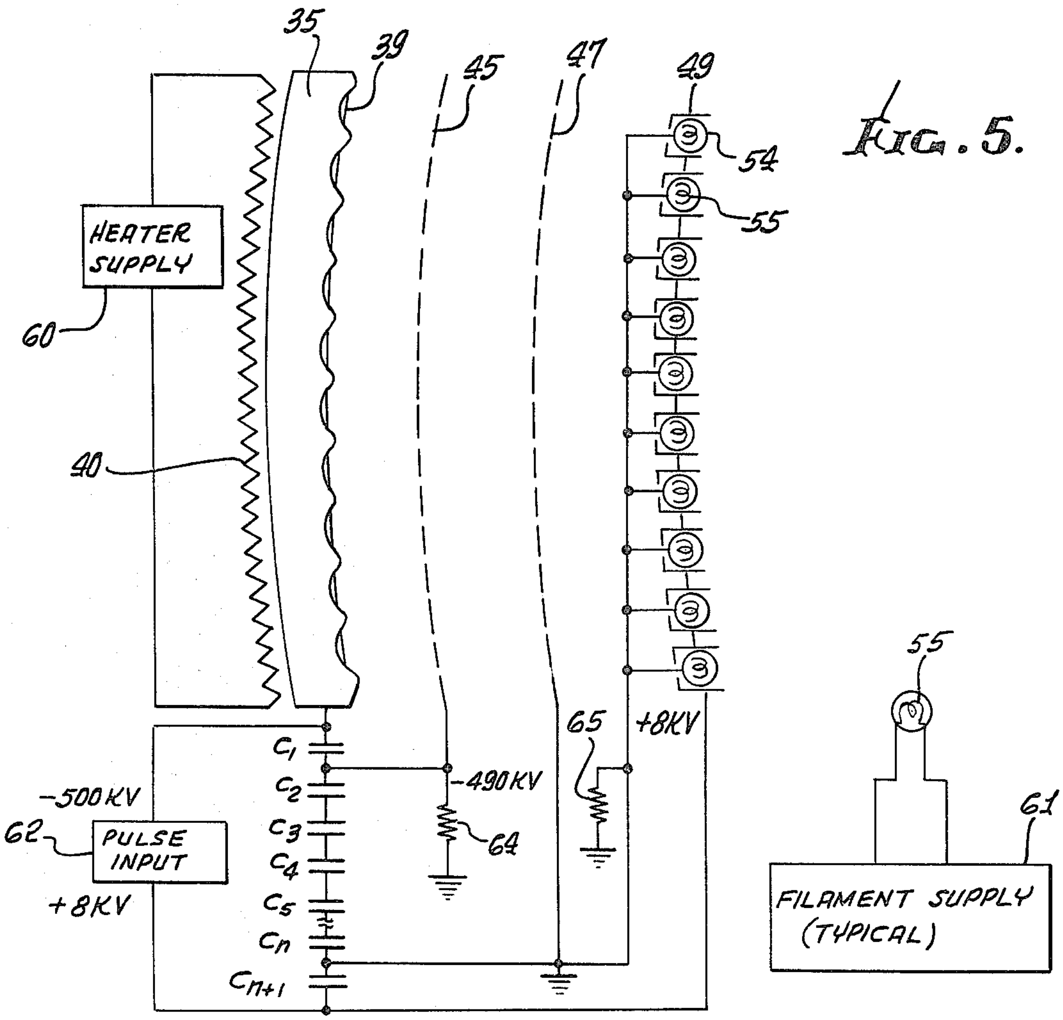
FIG. 5 is an electrical schematic for the source of FIG. 1.

Referring to the electrical schematic of FIG. 5, a heater supply 60 is connected across the substrate resistance heater 40. Another heater supply such as the supply 61 is provided for each of the filaments 55 of the electron source. A high voltage pulse supply 62 is connected across a plurality of capacitors $C_1$–$C_{N+1}$ connected in series. Typically the pulse input has a negative output of about 500 kv which is connected to the substrate 35 carrying the ion emitter material 39, and a positive output of about 8 kv which is connected to the electron accelerator grid electrodes 49. The capacitors $C_1$–$C_{n+1}$ function as a voltage divider for the pulse to provide appropriate potentials at the first extractor grid electrodes 45 and second accelerator grid electrodes 47. The second accelerator grid electrodes 47 are connected to circuit ground so that the ion beam leaves the source in a field-free space. A high impedance resistor 64 is connected between the electrodes 45 and circuit ground and another high impedance resistor 65 is connected between the electrodes 49 and circuit ground to provide for leakage of charges to ground during the pulse off period.

The voltage pulse from the supply 62 preferably increases in amplitude during the pulse period so that ions leaving the source at the end of the pulse are traveling faster than ions leaving at the start of the pulse so that the ion pulse is compressed in time during transit to the target. The surface of the substrate carrying the ion source material is made spherical so as to ballistically focus the ion beams to converge at a point at the target. The electron accelerator grid electrodes 49 decelerate the ion beams slightly in order to accelerate the electrons to substantially the same velocity as the ions. Typically the electron sources 54 are nickel tubes coated on the exposed surface with an electron emitting oxide. The quantity of electron emission may be controlled by adjusting the emitter temperature via the filament supply 61 so as to produce sufficient electrons to neutralize the electrical charge of the ion beam. While the overall charge of the beam with the combined positive and negative particles is substantially electrically neutral, there is not sufficient interaction between the negative electron particles and the positive ion particles to neutralize individual ions.

In operation, the source produces a plurality of fan shaped positive ion particle beams mixed with negative ion particles, with the negative ions (electrons) present in a quantity to provide an overall substantially neutral beam and with the positive and negative particles traveling at substantially the same velocity, with the particles ballistically focused by the source to converge at a point, thereby providing a pulse of particles at the point.

I claim

1. A source for a focussed high density electrically substantially neutral beam of combined positive and negative particles, including in combination:

- a housing;
- a substrate mounted in said housing and having a generally spherical surface;
- a plurality of strips of positive ion emitter material at said surface for emitting positive particles in beams;
- a first positive ion extractor grid mounted in said housing spaced downstream from said surface;
- a second positive ion accelerator grid mounted in said housing spaced downstream from said first grid;
- a plurality of electron emitter strips mounted in said housing spaced downstream from said second grid; and
- a third electron accelerator grid mounted in said housing between said second grid and said electron emitter strips;
- with said strips of positive ion emitter material aligned between said first and second grids for defining fan shaped ion beams, and
- with said third grid and electron emitter strips aligned with said first and second grids for introducing electrons with said ion beams with the electrons and positive ions mixed and traveling in a single direction at substantially the same velocity to produce substantially neutral beams adjacent said electron emitter strips and ballistically focussed to a target.

2. A source as defined in claim 1 including:

- a plurality of capacitors connected in series between said substrate and said third grid;
- means connecting said first and second grids to said capacitors intermediate said substrate and third grids; and
- an electrical pulse supply connected across said plurality of capacitors.

3. A source as defined in claim 2 including means for connecting said second grid to circuit ground to provide an electric-field-free space for the positive ions moving past said grid.

4. A source as defined in claim 3 wherein the capacitance of said capacitors and the voltage pulses of said pulse supply are of magnitudes to produce positive ions and electrons having substantially the same velocity at said third grid.

5. A source as defined in claim 1 wherein said positive ion emitter is a compound including a loosely bound medium weight element which compound on heating emits positive ions of said element, where medium weight elements are those in the range of lithium to rubidium.

6. A source as defined in claim 5 wherein said emitter material emits positive ions in the range of about 1000° to 2000° K. providing ions with random energy in the range of about 0.1 to 0.2 electron volts.

7. A source as defined in claim 5 wherein said emitter material element is an alkali metal.

8. A source as devined in claim 1 wherein said positive ion emitter material is B-eucryptite which on heating emits lithium ions.

9. A source as defined in claim 1 wherein said positive ion emitter material is sodium mordenite which on heating emits sodium ions.

10. A source as defined in claim 1 wherein said positive ion emitter material is potassium mordenite which on heating emits potassium ions.

11. A source as defined in claim 1 wherein said first grid includes a plurality of spaced conductors, with the distance between adjacent conductors not more than substantially twice the distance between said conductors and said positive ion emitter material.

12. A source as defined in claim 1 wherein said housing includes first and second electrical insulator support rings, with each support ring having a metal flange at each end, with said substrate carried on a metal flange of said first support ring and said first grid carried on a metal flange of said second support ring, with adjacent metal flanges of said first and second rings joined together at their periphery.

13. A source as defined in claim 12 including a third electrical insulator support ring with a metal flange at each end, with said second grid carried on a metal flange of said third support ring and with adjacent metal flanges of said second and third support rings joined together at their periphery.

14. A source as defined in claim 13 including a fourth electrical insulator support ring having a metal flange at each end, with said third grid carried on a metal flange of said fourth support ring and with adjacent metal flanges of said third and fourth support rings joined together at their periphery.

15. A source as defined in claim 12 including a metal spacer ring positioned between said first and second support rings.

16. A source for a focussed high density electrically substantially neutral beam of combined positive and negative particles, including in combination:

a housing;

a substrate mounted in said housing and having a generally spherical surface;

means for providing positive ions over said surface;

a first positive ion extractor grid mounted in said housing spaced downstream from said surface, said first grid including a plurality of spaced conductors, with the distance between adjacent conductors not more than substantially twice the distance between said conductors and said surface;

a second positive ion accelerator grid mounted in said housing spaced downstream from said first grid;

a plurality of electron emitter strips mounted in said housing downstream from said second grid; and a third electron accelerator grid mounted in said housing between said second grid and said electron emitter strips;

with said first and second grids defining fan shaped ion beams from said surface, and with said third grid and electron emitter strips aligned with said first and second grids for introducing electrons with said ion beams with the electrons and positive ions mixed and traveling in a single direction at substantially the same velocity to produce substantially neutral beams adjacent said electrom emitter strips and ballistically focussed to a target.

17. A source as defined in claim 16 wherein said housing includes first and second electrical insulator support rings, with each support ring having a metal flange at each end, with said substrate carried on a metal flange of said first support ring and said first grid carried on a metal flange of said second support ring, with adjacent metal flanges of said first and second rings joined together at their periphery.

18. A source as defined in claim 17 including a third electrical insulator support ring with a metal flange at each end, with said second grid carried on a metal flange of said third support ring and with adjacent metal flanges of said second and third support rings joined together at their periphery.

19. A source as defined in claim 18 including a fourth electrical insulator support ring having a metal flange at each end, with said third grid carried on a metal flange of said fourth support ring and with adjacent metal flanges of said third and fourth support rings joined together at their periphery.

20. A source as defined in claim 17 including a metal spacer ring positioned between said first and second support rings.

21. A source as defined in claim 16 including:

a plurality of capacitors connected in series between said substrate and said third grid;

means connecting said first and second grids to said capacitors intermediate said substrate and third grids; and an electrical pulse supply connected across said plurality of capacitors.

22. A source as defined in claim 21 including means for connecting said second grid to circuit ground to provide an electric-field-free space for the positive ions moving past said grid.

23. A source as defined in claim 22 wherein said first, second and third grids and electron emitting strips are aligned defining fan shaped beam spaces therebetween.

24. A source as defined in claim 23 wherein the capacitance of said capacitors and the voltage pulses of said pulse supply are of magnitudes to produce positive ions and electrons having substantially the same velocity at said third grid.

* * * * *